United States Patent

Busse

[11] Patent Number: 5,950,506
[45] Date of Patent: *Sep. 14, 1999

[54] LOCKING DEVICE FOR BICYCLES

[76] Inventor: Peter Busse, Liegnitzer Str. 42, D-10999, Berlin, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,702
[22] PCT Filed: May 17, 1995
[86] PCT No.: PCT/DE95/00670
   § 371 Date: Dec. 16, 1996
   § 102(e) Date: Dec. 16, 1996
[87] PCT Pub. No.: WO96/00678
   PCT Pub. Date: Jan. 11, 1996

[30] Foreign Application Priority Data

Jun. 29, 1994 [DE] Germany .............................. 44 23 773
Jul. 15, 1994 [DE] Germany .............................. 44 26 663
Oct. 5, 1994 [DE] Germany ........................ 94 16 705 U

[51] Int. Cl.$^6$ .............................. B25B 13/06; B62H 5/00; E05B 71/00; F16B 41/00
[52] U.S. Cl. ........................... 81/121.1; 70/233; 411/402; 411/910
[58] Field of Search ................................... 81/121.1, 186; 70/233, DIG. 57, 51–53, 57–58, 229–232, 259; 411/371–374, 910, 919, 83, 132–133, 402, 410, 900; 301/111, 114–115

[56] References Cited

U.S. PATENT DOCUMENTS 1,658,886  2/1928  Dickey .
2,248,695  7/1941  Bradshaw .
3,034,386  5/1962  Corlett et al. .
3,060,785  10/1962  Corlett et al. .
3,709,401  1/1973  Walstrom .
3,930,428  1/1976  Hale .
4,151,897  5/1979  Schoch .
4,674,306  6/1987  Halpern .
4,732,517  3/1988  Crouch et al. .

FOREIGN PATENT DOCUMENTS 0405025  1/1991  European Pat. Off. .
2256821  12/1992  United Kingdom .
9306375  4/1993  WIPO .

Primary Examiner—D. S. Meislin
Attorney, Agent, or Firm—Mark P. Stone

[57] ABSTRACT

The invention relates to a locking device for bicycles having a nut which can be screwed on a threaded stud on the bicycle, a lock section and a cap, the base of which, with the nut on its thread, is between the nut on its thread, is between the nut and the frame or saddle post, its cylindrical wall surrounds the nut and ends in the region of the face of the nut and, when tightened, can rotate freely, where the surfaces of the nuts of several bicycles differ from one another and the part of the lock section of a bicycle accepting the nuts matches certain nuts on that bicycle. The lock section takes the form of a unique lock (2), the outside surfaces of the nuts (1) differ, and the cap (3) is at a short distance from the part of the nut (1) which projects furthest radially outwards. The locking device provides security against the theft of bicycles and their components.

21 Claims, 3 Drawing Sheets

LOCKING DEVICE FOR BICYCLES

BACKGROUND OF THE INVENTION

The invention relates to locking device for bicycles, comprising a nut which can be screwed onto a threaded rod of the bicycle, a key part and a cap, the base of which, when the nut is located on its thread, is situated between the nut and a part of the bicycle which is opposite the nut, and the cylindrical wall of which cap surrounds the nut and ends in the region of the end face of the nut, and which cap, in the tightened state, is freely rotatable, the surfaces of the nuts of a plurality of bicycles differing from one another and that part of the key part of a bicycle which engages the nuts being adapted in a positively locking manner to certain nuts of this bicycle.

In a known locking device of this kind (U.S. Pat. No. 4,674,306), the key part is rigidly connected to a lock for locking the bicycle, for example to a fixed post. The differences in respect of the nut surfaces are limited to the end faces of the nut. The cap is positioned in a sliding manner, i.e. practically without clearance, on the nut (with a circular peripheral face).

This locking device has a number of drawbacks: the combination of key and lock is disadvantageous in as much as anyone who breaks open the lock then has the key at his disposal and can thus loosen the nut. Under certain circumstances it may even be that the key protection is unimportant for anyone who breaks open the lock, which can be carried out without a problem using an appropriate tool, since he is then able to steal the entire bicycle. The fact that the differences with respect to the nut surfaces are limited to the end faces of the nuts has the disadvantage that a thief can loosen a nut using hammer and chisel. He is also able to loosen the nuts if he compresses the cap using a strong pair of pliers and thus presses against the nut and then turns the cap and nut using the pair of pliers.

The object of the invention is to design the locking device mentioned at the outset such that greater security compared to the known case is provided with regard to loosening the nuts or theft of individual parts of the bicycle, in particular the wheels and/or the saddle.

SUMMARY OF THE INVENTION

This object is achieved according to the invention in that the key part is designed as a separate key, in that the peripheral surfaces of the nuts are different, and in that the cap is at such a short distance from that part of the nut which projects furthest radially outwards that the key can engage around the nut.

The key part is thus a pure key which can be taken away by the owner of the bicycle. A third party thus has virtually no way of coming into possession of the key. In addition, since the irregularities relate to the periphery of the nut, a thief is unable, or less able than in the known case, to loosen a nut with hammer and chisel. Finally, he is unable, or less able than before, to grip and then rotate a nut by deforming the cap; this is prevented by the distance which the cap is at from the nut (in particular>1 mm). By means of the separation according to the invention of lock and key, the bicycle can also be protected better overall against theft than with the U-shaped lock in accordance with U.S. Pat. No. 4,674,306, which is relatively easy to break open; instead of this lock, a lock which is more difficult to break open, e.g. a steel-casing lock, is used.

The locking device according to the invention is primarily used to fasten a wheel shaft and/or a seatpost on the bicycle frame and/or a saddle on the seatpost. However, it is additionally also suitable, for example, for fastening the handlebars and/or the bottom bracket bearing on the frame.

A further development of the invention consists in the cap projecting slightly beyond the nut in the tightened state of the locking device. In this way, the nut is particularly well protected.

Furthermore, it is proposed that in the tightened state of the locking device, the outer wall of the cap runs conically away from the frame of the bicycle. As a result, the cap can no longer, or can scarcely, be gripped by a pair of pliers and squashed (in order then subsequently to rotate the nut), because a pair of pliers would slip off owing to the conical shape of the cap.

Furthermore, it is proposed to protect the space between nut and cap against the penetration of quick-setting materials, in particular adhesives. According to the invention this can be achieved in that a TEFLON disc or TEFLON cap, to which adhesive does not stick, is situated between cap and nut, or in that the surfaces are TEFLON-coated.

A further development of the invention furthermore consists in that, in the tightened state of the locking device, the nut being located on a pin of the locking device, which pin, at the other end, has a head which is integral with the pin, the pin being located in a wheel hub of the bicycle, comprising a non-rotatable bearing and a rotatable outer part, or retaining a seatpost on the frame of the bicycle or the saddle on the seatpost of the bicycle.

In this way, it is now possible to provide parts of bicycles, such as wheels and saddles, which can be fastened using a quick-release closure, with a protection against theft: to this end, the pin with the quick-release closure is exchanged for a pin with a head (the quick-release ability, however, then no longer exists).

Finally, it is proposed for the end faces of the nuts to be delimited by edges for which the tangents at each of their points form an angle of greater than 45°, in particular greater than 50°, with the radii at these points. The nut can then no longer be loosened using hammer and chisel.

BRIEF DESCRIPTION OF THE DRAWINGS

Further details of the invention emerge from the drawing, in which.

DESCRIPTION OF THE BEST MODES FOR CARRYING OUT THE INVENTION

Figure 1:
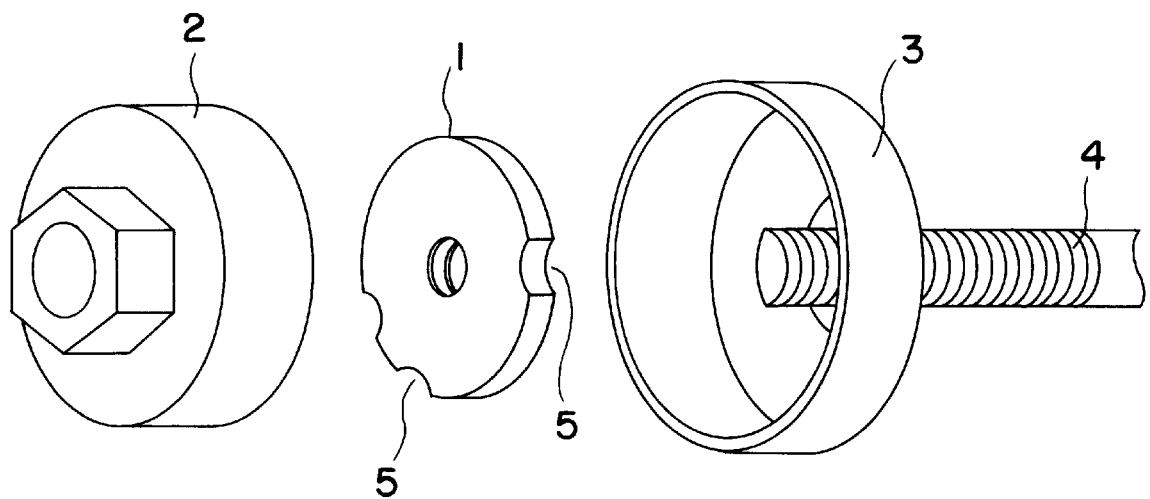
FIG. 1 is a perspective view of the major components of the locking device in accordance with the preferred embodiment of the invention before the device is installed in a locking position on a bicycle.

In FIG. 1, 1 denotes a nut, 2 a key for actuating the nut 1, 3 a cap and 4 a thread. The nut 1 has notches 5, into which webs or projections in the inside of the key 2 can engage, on the edge. The key 2 comprises a sleeve and a hexagonal nut without an internal thread, which nut can be actuated using a conventional further key. In the firmly tightened state, the cap 3 completely surrounds the nut 1 and, in addition, projects beyond it. The cap 3 is freely rotatable.

Figure 2:
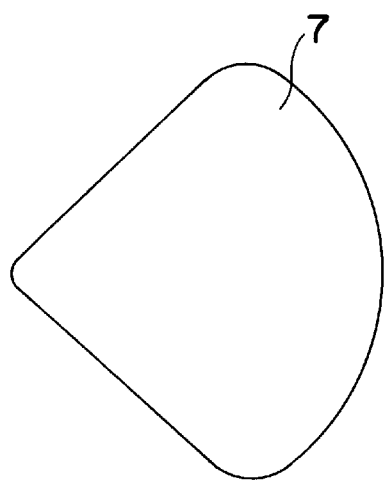
FIG. 2 illustrates a top view of a nut in accordance with the locking device of the present invention.

FIG. 2 shows a further embodiment, specifically the top view of a nut 7. This nut is distinguished by an approximately triangular peripheral shape. The key (not shown) assigned to it has a recess which, when the key is placed on the nut 7, surrounds the latter tightly.

Figure 3:
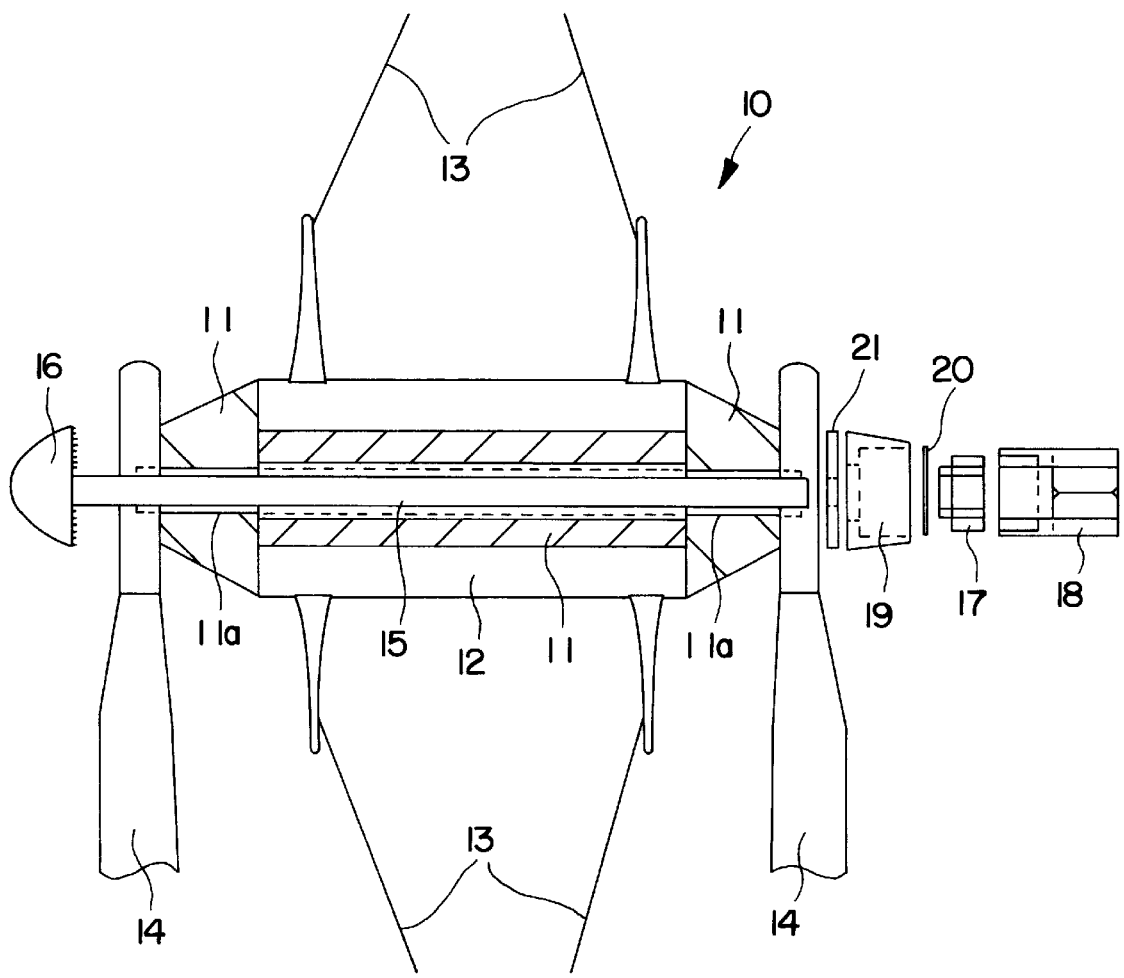
FIG. 3 is a side elevational view, in section, illustrating a further embodiment of a locking device in accordance with the present invention.

FIG. 3 shows an embodiment which replaces a quick-release lock. 10 denotes a front-wheel hub, comprising a non-rotatable bearing 11 with a tube 11a fitted inside it and a rotatable outer part 12. Spokes 13 are positioned on the outer part 12. 14 denotes bicycle forks. A pin 15 has a head 16 on the left, which head has a knurling on its side facing the forks 14. On the right-hand side, a nut 17 can be screwed onto the pin 15 by means of a key 18. The knurling on the head 16 prevents the pin 15 from also turning as the nut 17 is tightened. The nut 17 exhibits the irregularities according to the invention on its peripheral surface. The key 18 is shaped correspondingly on its side facing the nut 17. Its right-hand end has a hexagonal contour. The key 18 can thus be actuated using a conventional spanner. In the screwed-on state, a cap 19 surrounds the nut 17. A TEFLON disc 20 is situated between nut 17 and cap 19. A contact disc 21 is situated between cap 19 and bicycle forks 14. The head 16 is round, so that it offers no means of engagement for a pair of pliers. It may, of course, also be conical (for example doubly conical, such that on the outside a certain conicity is adjoined by a larged conicity).

Figure 4:
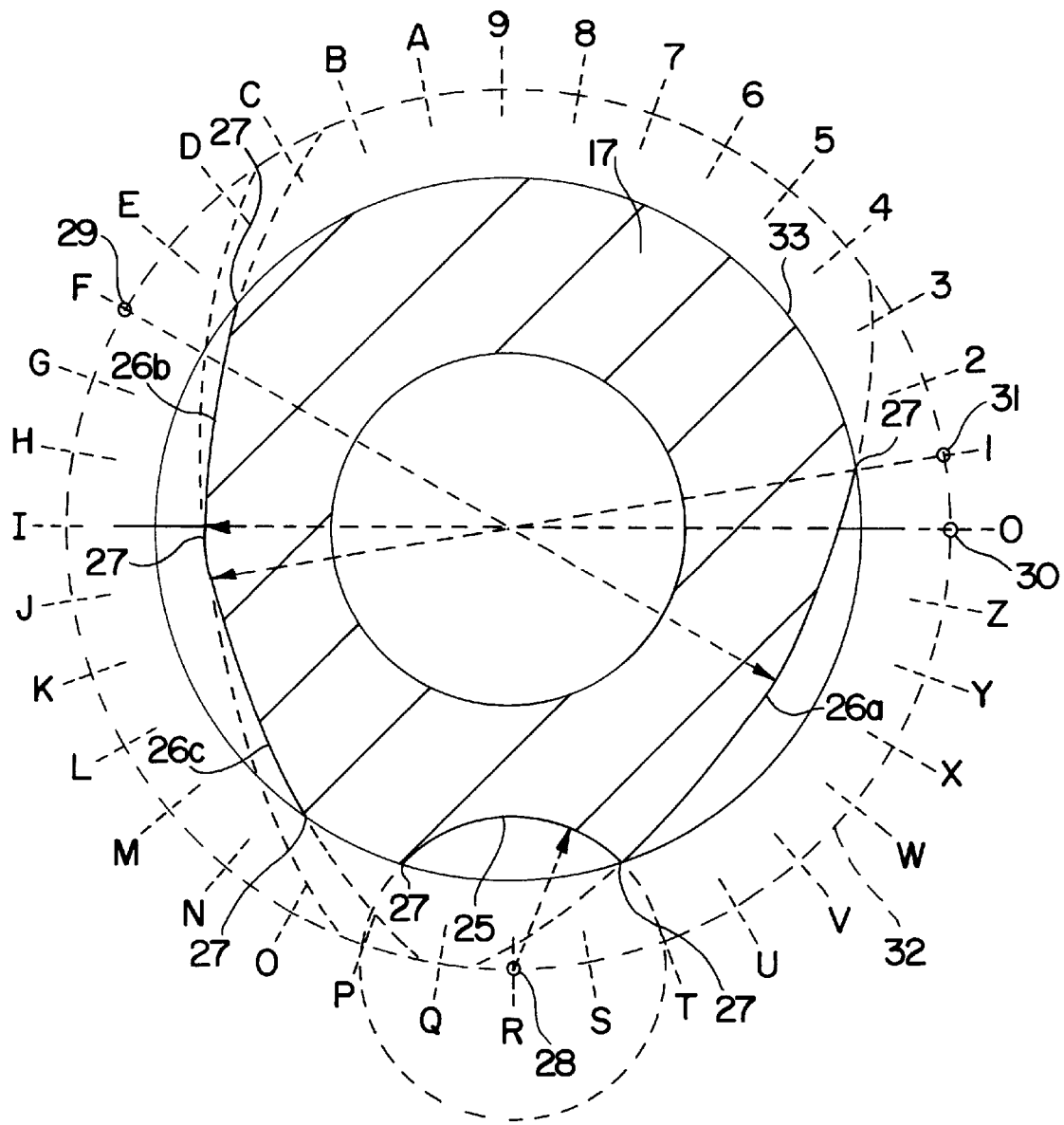
FIG. 4 is an elevational view of a nut employed in the locking device illustrated by FIG. 3.

FIG. 4 shows the end side of the nut 17 on an enlarged scale. Its periphery is formed by a small notch 25 and three segments 26a, b and c. The latter in each case extend between the points 27 and are circular. The notch 25 has the centre 28. The segment 26a has the centre 29, the segment 26b has the centre 30 and the segment 26c has the centre 31. The centres 28 to 31 lie on a secondary circle 32. The upper part of the periphery of the nut 17 is formed by a segment 33, which has its centre at the centre of the nut 17. The transitions between the individual segments or the notch 25 and the adjoining segments are likewise circular.

The nuts in a series differ from one another in that some or all of the centres 29, 30, 31 are situated at respectively different locations. The circle 32 has 36 points, which are situated at identical intervals from one another. Each point may be a centre. The number of nuts which can be produced in accordance with this rule with the proviso that one shape occurs only a single time is then approximately 650. In this way, therefore, it is possible to produce an extremely large number of nuts which differ from one another. In addition, the shapes, and specifically those of the nuts and those of the keys, can be manufactured relatively simply by milling. If the points on the secondary circle 32 are provided with reference numerals 0, 1, . . . 9, and then with letters A, B, . . . Z (cf. FIG. 4) then the centres of the circles in question would lie at the points 0, 1, F and R. When coding the various nuts, the nut shown in FIG. 4 would then have the code: 01FR The nuts on the wheel shafts of tricycles or motorcycles may also be protected in the manner according to the invention.

I claim:

1. A plurality of locking devices for a plurality of bicycles, said plurality of locking devices comprising at least:
   a first locking device for a first bicycle comprising:
      first nut means for engaging a threaded rod of said first bicycle;
      first cap means comprising first base means for freely rotating relative to said first nut means, and first cylindrical wall means extending from said first base means for surrounding said first nut means;
      said first nut means having a periphery defining a first predetermined configuration;
      first key means for engaging the periphery of said first nut means for rotating said first nut means;
      said periphery of said first nut means and said first cylindrical wall means being oriented to define a space therebetween substantially equal to the thickness of a portion of said first key means engaging said periphery of said first nut means;
      said first key means having no locking function other than engagement and rotation of said first nut means; and
   a second locking device for a second bicycle comprising:
      second nut means for engaging a threaded rod of said second bicycle;
      second cap means comprising second base means for freely rotating relative to said second nut means, and second cylindrical wall means extending from said second base means for surrounding said second nut means;
      said second nut means having a periphery defining a second predetermined configuration different from said first predetermined configuration of said first nut means;
      second key means for engaging the periphery of said second nut means for rotating said second nut means;
      said periphery of said second nut means and said second cylindrical wall means being oriented to define a space therebetween substantially equal to the thickness of a portion of said second key means engaging said periphery of said second nut means;
      said second key means having no locking function other than engagement and rotation of said second nut means.

2. The locking devices as claimed in claim 1, wherein the peripheral surface of said first nut means is irregular in form.

3. The locking devices as claimed in claim 1, wherein said first cylindrical wall means of said first cap means extends slightly beyond a surface of said first nut means facing away from said first base means when said first nut means is in a tightened position.

4. The locking device as claimed in claim 1, wherein said first key means comprises a sleeve engageable around said first nut and a projection extending from said sleeve, said projection defining a bore having no internal threading, said projection extending away from said sleeve and away from said first base means, said projection being engageable by a conventional key.

5. The locking devices as claimed in claim 1, wherein the outer surface of said first cylindrical wall means of said first cap means is oriented conically away from a frame of a first bicycle on which said first locking device is assembled.

6. The locking devices as claimed in claim 1, further including anti-adhesion means in said space defined between said first nut means and said first cap means for preventing materials from adhering to said first nut means and said first cap means.

7. The locking devices as claimed in claim 6, wherein said anti-adhesion means is an element consisting of an anti-adhesive material.

8. The locking devices as claimed in claim 6, wherein said first nut means and said first cap means are coated with an anti-adhesive material.

9. The locking devices as claimed in claim 1, wherein said first nut means, in a tightened position, is positioned on one end of a pin comprising the threaded rod of the first bicycle, the other end of said pin having a head portion extending integrally therefrom, said pin located in a wheel hub of the first bicycle comprising a non-rotatable bearing and a rotatable outer part.

10. The locking devices as claimed in claim 9, wherein said head portion of said pin is knurled on a side thereof facing a portion of said first bicycle.

11. The locking devices as claimed in claim 1, wherein said first nut means, in a tightened position, is positioned on one end of a pin comprising the threaded rod of the first bicycle, the other end of said pin having a head portion extending integrally therefrom, said pin retaining a seatpost on a frame of the first bicycle.

12. The locking devices as claimed in claim 11 wherein said head portion of said pin is knurled on a side thereof facing a portion of said first bicycle.

13. The locking device as claimed in claim 1, wherein said first nut means, in a tightened position, is positioned on one end of a pin comprising the threaded rod of the first bicycle, the other end of said pin having a head portion extending integrally therefrom, said pin retaining a saddle on a seatpost of the first bicycle.

14. The locking devices as claimed in claim 13, wherein said head portion of said pin is knurled on a side thereof facing a portion of said first bicycle.

15. The locking devices as claimed in claim 1, further including a contact disk disposed between said cap surrounding said first nut means and a frame of the first bicycle for transmitting contact force of said first nut means to said frame of said first bicycle.

16. The locking device as claimed in claim 1, wherein said first and second nut means each have a cross sectional configuration defining an indentation and three circular segments; each of said circular segments having a center lying on a secondary circle; said secondary circle having a diameter which is larger than a largest diameter of each of said first and second nut means.

17. The locking devices as claimed in claim 16, wherein said secondary circle has a predetermined number of points, and said centers of said three segments of circles lie on said points; the position of said center of said first nut means differing from the position of the center of said second nut means.

18. The locking devices as claimed in claim 16, wherein said indentation of said first nut means is formed in a circular shape.

19. The locking devices as claimed in claim 16, wherein the diameter of said secondary circle is substantially 1.5 times as large as said largest diameter of each of said first and second nut means.

20. The locking devices as claimed in claim 1, wherein said first nut means defines edges having tangents at predetermined points on said edges which are oriented at an angle greater than 45 degrees relative to radii of said first nut means extending to said predetermined points.

21. The locking devices as claimed in claim 20, wherein said angle relative to said radii of said first nut means is greater than 50 degrees.

* * * * *

UNITED STATES PATENT AND TRADEMARK OFFICE
CERTIFICATE OF CORRECTION

PATENT NO. : 5,950,506
DATED : September 14, 1999
INVENTOR(S) : Peter Busse

It is certified that error appears in the above-identified patent and that said Letters Patent is hereby corrected as shown below:

Claim 4, Line 3 (Col. 4, Line 41):

After "nut", add - -means- -.

Signed and Sealed this

Twenty-ninth Day of February, 2000

Attest:

Attesting Officer

Q. TODD DICKINSON

Commissioner of Patents and Trademarks